United States Patent [19]

Freiberg

[11] 4,314,745
[45] Feb. 9, 1982

[54] MICROFILM READING DEVICE

[75] Inventor: Günter Freiberg, Munich, Fed. Rep. of Germany

[73] Assignee: Agfa-Gevaert AG, Leverkusen, Fed. Rep. of Germany

[21] Appl. No.: 131,356

[22] Filed: Mar. 18, 1980

[30] Foreign Application Priority Data

Mar. 21, 1979 [DE] Fed. Rep. of Germany ....... 2911090

[51] Int. Cl.³ ............................................. G03B 21/11
[52] U.S. Cl. .................................................. 353/101
[58] Field of Search ..................... 353/101, 100, 27 R; 350/254, 255, 252, 241

[56] References Cited
U.S. PATENT DOCUMENTS 3,064,529 11/1962 Straat .............................. 350/254 X
3,792,923 2/1974 Pfefer et al. .................... 353/101 X
3,809,460 5/1974 Lettan et al. ........................ 350/254

Primary Examiner—Harry N. Haroian
Attorney, Agent, or Firm—Michael J. Striker

[57] ABSTRACT

A microfilm reading device in which a lens carrier is provided with two projecting lenses which are in axial parallel alignment with each other. Through actuating a handle which is disposed between the projecting lenses, the projecting lenses can be moved from a first position in which the lens is brought in alignment with a micrograph to be projected into a second position in which the lens is lifted while the other lens is brought in alignment with the micrograph.

14 Claims, 4 Drawing Figures

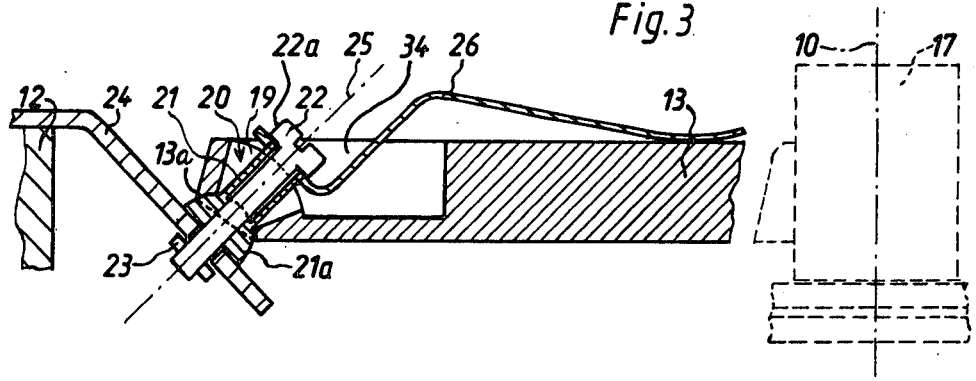
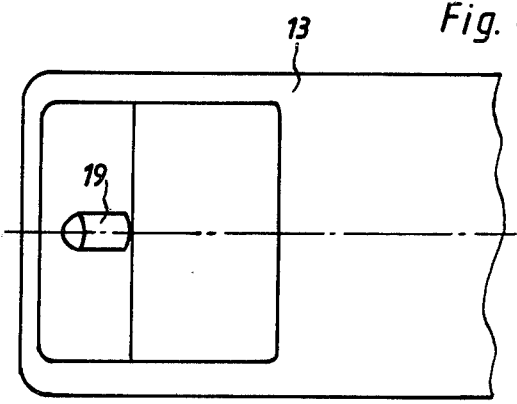
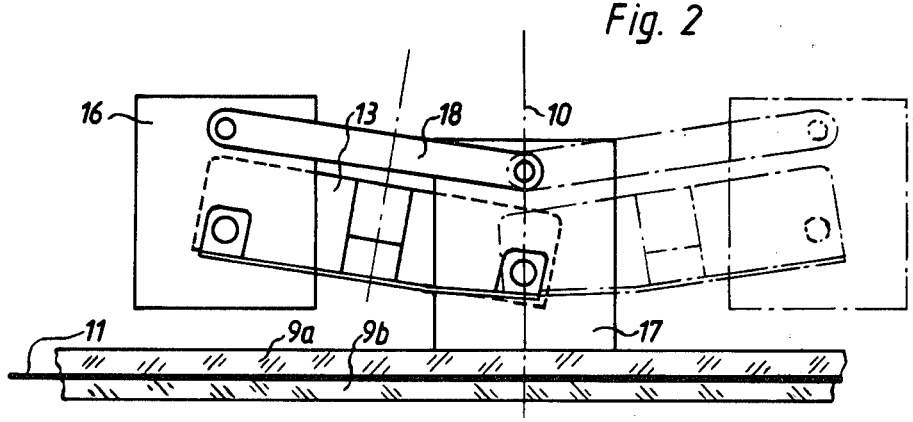

MICROFILM READING DEVICE

BACKGROUND OF THE INVENTION

This invention relates generally to a microfilm reader and more particularly to a microfilm reading device for selectively positioning one of several projecting lenses relative to a micrograph, the projecting lenses being supported by a lens carrier which is movable relative to the microfilm reading device.

In the prior art microfilm readers projecting lenses are provided having different magnifications wherein the lenses are interchangeably mounted within a lens tube. Consequently, an operator can insert the lens having the desired magnification into the respective lens tube. In most cases, the use of two lenses with different magnifying factors is sufficient for a continuous operation. Therefore, microfilm readers are frequently offered as having two lenses mounted on a lens carrier. Accordingly the reader must have means for adjusting the respective lens relative to the micrograph.

In the prior art, there is known a microfilm reader which has an upper portion on whose bottom side a double lens carrier is slidably arranged above the micrograph to be projected. In order to position the respective lens relative to the micrograph during the sliding of the lens carrier, inclinations are provided in order to achieve that the respective lens is abutting a transparent glass plate usually covering the micrograph while the other lens which is not in use is lifted from the transparent plate. This principle seems to be sound, however, the structural solutions for carrying the principle into effect are rather complicated and expensive since inclinations are provided which must be constructed in a special manner.

SUMMARY OF THE INVENTION

It is therefore a general object of the present invention to overcome the aforementioned disadvantage.

More particularly, it is an object of the invention to provide a microfilm reader in which the adjustment of the respective lens relative to the micrograph is obtained by a simple construction which is reliable in operation and inexpensive to manufacture nevertheless.

In keeping with these objects, and others which will become apparent hereafter, one feature of the invention resides, in a microfilm reader of the above-described type, having a film table for supporting a microfilm and a light source behind the film table so that light rays passes through the microfilm in a predetermined path, a combination including a lens carrier above the film table; a pair of projecting lenses mounted on the carrier, and means mounting the carrier for pivotal movement about an axis inclined to the predetermined path between two end positions in each of which a different one of the lenses is interposed in the path.

By virtue of such an arrangement, the swinging movement of the lens carrier is thus also sloped relative to the microfilm so that upon a swinging of the lens carrier an adjusting of the lens relative to the microfilm or a lifting of the lens therefrom is automatically obtained. According to a preferred embodiment, the lens carrier is swingable around a stud bolt which is at an inclination relative to the projecting course of beam emitted by an illumination unit of the reading device in the zone of the projecting lenses so that the deepest position of the respective projecting lens is simultaneously the position in which the lens is in alignment with the micrograph. Upon swinging of the lens carrier, the respective lens is automatically lifted from the micrograph while the other lens is lowered automatically to its deepest position in which an alignment with the micrograph is achieved.

According to still another feature of this invention, the lens carrier is inclinable in a direction perpendicular to the swinging movement by providing the lens carrier with a rectangular recess the rear inner surface of the lens carrier being truncated coneshaped and provided with a hole in which the stud bolt is inserted. The hole is arranged in such a manner, that it is essentially radial to the rotational axis of the lens carrier which is in addition subjected to a force in direction to the microfilm. The force is caused by a flat spring which is connected to the stud bolt. Consequently, the lens carrier can be lifted counter to the force of the flat spring and irrespective of the swinging motion thereby achieving a considerable freedom of movement and nevertheless an accurate guiding of the lens carrier.

According to yet another feature of the invention, the projecting lenses are floatingly supported in a known manner at the free end of the lens carrier and are additionally connected to each other e.g. by a H-shaped joint so that the projecting lenses are axially parallel aligned to each other. Through the provision of a floating support of the projecting lenses, an accurate alignment of the respective lens is achieved relative to the micrograph. Moreover, the two lenses are connected by a coupling member thereby preventing a self-acting swinging motion of the projecting lens which is in the lifted position i.e. not in alignment with a micrograph. Therefore, upon positioning a microfilm platform in which the microfilm is contained a sticking of the platform rim on the lens or lens tube is prevented when the lens or lens tube is in the path of movement of the platform and possibly tilted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DRAWING DESCRIPTION OF THE DRAWING

FIG. 2 shows a front view of the lens carrier;

FIG. 3 shows a sectional side view of the bearing of the lens carrier; and

FIG. 4 shows a top view of the bearing according to FIG. 3.

DESCRIPTION OF THE PREFERRED EMBODIMENTS

Figure 1:
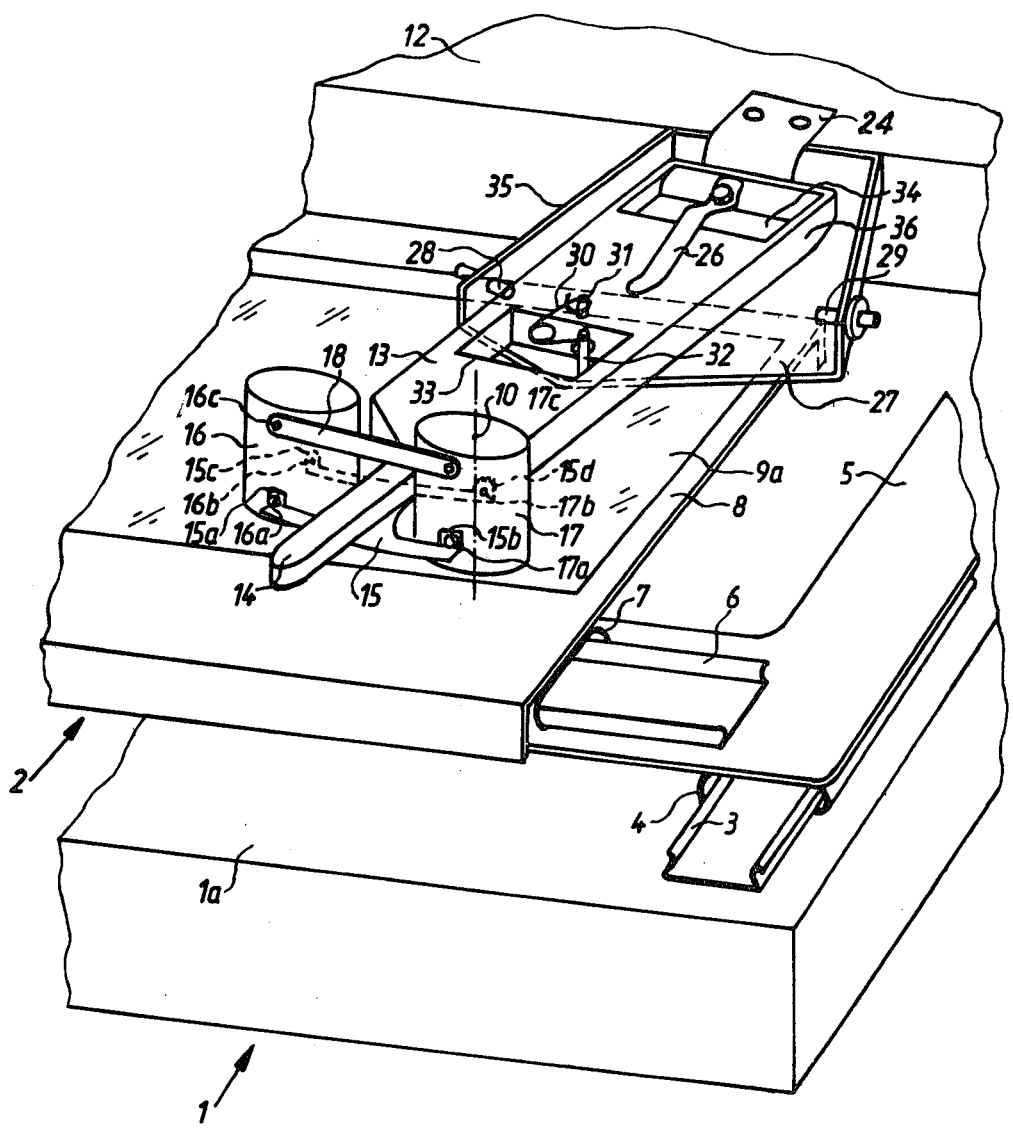
FIG. 1 shows a section in perspective view of a microfilm reading device having a lens carrier supported according to the invention.

Referring firstly to FIG. 1, there is shown a microfilm reader having a bottom portion 1 and a light source (not shown) for illuminating a selected micrograph of a microfilm 11. The bottom portion 1 has a top surface 1a on which a film table 2 is mounted. The film table 2 has a frame 8 in which two transparent plates 9a, 9b are kept in superposing manner. The microfilm 11 can be inserted inbetween the two plates, the one plate which is in the upper position being liftable. The film table 2 is movably supported on the top surface 1a in two axis perpendicular to each other in one plane. In order to achieve this mobility of the table 2, an elongated guide rail 3 is fixed on the top surface 1a and being connected to a coaxially arranged rail 4 which is running in ball bearings. The rail 4 carries a rectangular angle sheet iron 5 whose one leg is mounted on the rail 4 and whose other leg is supported on the top surface 1a in a manner not shown in detail through a glider. Perpendicular to the guide rail 3 and coaxially arranged on the other leg of the angle sheet iron, there is provided a further guide rail 6 on which a second rail 7 is coaxially supported. The rail 7 carries the forward end of the frame 8 whose rear end is supported by the top surface 1a.

For projection of the micrograph, the reading device is provided with a dome-shaped upper portion (not shown) in which surface mirrors are arranged in a known manner and therefore are not explained in detail. Furthermore, the upper portion is provided with a surface of projection facing the operator. The upper portion of the reading device emits a projecting course of beam 10 which must be in alignment with the micrograph to be projected. Therefore, the table 2 must be moved along the respective rails in such a manner that the micrograph is positioned exactly in the projecting course of beam.

As can be seen from FIG. 1, the microfilm reading device is further provided with a stationary portion 12 to which an elongated lens carrier 13 is mounted and is projecting therefrom above the table 2. The other end of the lens carrier 13 carries two projecting tubes 16, 17 which are spaced from each other. Disposed between the two projecting tubes 16, 17 is an elongated handle 14 which is intergrally connected to the lens carrier 13. Through actuation of the handle 14, a swing motion of the lens carrier 13 is obtained. The two projecting tubes 16, 17 are floatingly connected by an H-shaped resilient support 15 which has a cross bar fixed to the forward end of the lens carrier 13 and two longitudinal bars which are parallel to each other. Each end of the longitudinal bars is provided with a respective tab 15a, 15b, 15c, 15d which is in engagement with a respective pin 16a, 16b, 17a, 17b projecting from a respective position on the lens tube. In order to achieve a permanent axis parallel alignment, the lens tubes 16, 17 are connected by a coupling element 18 arranged above the handle 14 and fixed by means of bolts 16c, 17c to the respective projecting tube 16, 17. Each of the lens tubes, contains a lens which can be focussed relative to the micrograph to be projected by a known mechanism (not shown).

Referring now to FIG. 3, there is shown the attachment of the lens carrier to the microfilm reading device. Accordingly, the lens carrier 13 having a rear end fixed to the stationary position 12 of the reading device is provided with a recess 34 the rear inner surface defining the recess 34 respectively, being shaped in a truncated cone manner. The inner surface is provided with a hole 19 having also a truncated cone shape. Into the hole 19, a stud bolt 20 is insertable whose diameter corresponds to the width of the hole 19. The longitudinal direction of the hole 19 is shown in the drawing plane in FIG. 4. The stud bolt 20 is provided with a sleeve 21 encircling a major part of a bolt 22 having a head 22a. The bolt 22 is protruding through an angle sheet iron 24 and fixed thereto by a nut 23. The flat iron sheet 24 has a horizontal portion which is fixed to the stationary portion 12 and a downward portion integrally connected at an obtuse angle to the horizontal portion.

As can be seen from FIG. 3, the sleeve 21 has a hemispherical portion 21a at its lower region. The flat portion of the hemisphere is abutting on the downward portion of the angle sheet iron 24 and the spherical portion engages in a respectively curved recess 13a within the lens carrier 13. Consequently, the lens carrier is supported in a ball bearing so that the lens carrier is pivotable around the stop bolt 20 wherein the freedom of movement of the lens carrier 13 is limited by the arrangement of the stop bolt 20 and the hole 19.

As is obvious from FIG. 3, the lens carrier 13 is pivotable around a rotational axis 25 which is inclined relative to the projecting course of beam 10 so that the lens carrier 13 is covering a cone-shaped area around the rotational axis 25 upon actuating the handle 14. Since the arrangement of the hole 19 is essentially radial to the rotational axis 25, a movement of the lens carrier 13 is possible in direction towards and away from the axis 25. In order to achieve a sufficient abutting of the respective lens tube 16, 17 on the plate 9a, a flat spring 26 is arranged whose one end is abutting the lens carrier 13 thereby exerting a force thereto in downward direction and whose other end is clamped between the head 22a of the bolt 22 and the sleeve 21.

Referring now to FIG. 1, there is shown a support 27 whose rear end is fixed to the stationary portion 12 of the reading device and which is partly surrounding the lens carrier 13. The support 27 has two diverging side portions 35, 36 the end of which remote to the stationary portion is provided with a respective pin 28, 29 protruding through the respective side portion into the interior of the support 27. The pins 28, 29 cooperate with the lens carrier 13 for defining the swinging motion thereof. The position in which the lens carrier 13 is abutting the respective pin 28, 29 is simultaneously the position in which one of the lens tubes 16, 17 is in alignment with the micrograph to be projected.

The lens carrier 13 is further provided with a breakthrough 33 through which a pin 32 is protruding which is fixed on the support 27. Fixed to the pin 32 is one leg of a spring clip 30 whose other leg is fixed to a second pin 31 fixed on the lens carrier 13. Through the provision of such a spring arrangement, it is achieved that the lens carrier 13 is either pressed to a first position abutting the pin 28 or in a second position abutting the pin 29 or is kept in a mid-position in which the spring clip 31 does not exert any force onto the lens carrier 13.

As can be seen from FIG. 2, there is shown the path of motion of the lens carrier 13 relative to the glass plates 9a, 9b swinging of the lens carrier 13. Thus, the lens tube 16 which is not in the projecting position is automatically lifted from the transparent plate 9a while the lens tube 17 which is in alignment with the micrograph to be projected is pressed onto the transparent plate 9a through its own weight and the effect of the spring clip 26. The floating support of the lens secures a uniform abutting of the respective lens tube regardless of the tolerances in the guide of the platform 2.

It will be understood that each of the elements described above, or two or more together, may also find a useful application in other types of microfilm reading devices differing from the types described above.

While the invention has been illustrated and described as embodied in a microfilm reading device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt if for various applications without omitting features that, from the standpoint of prior art, fairly constitute essential characteristics of the generic or specific aspects of this invention.

What is claimed as new and desired to be protected by Letters Patent is set forth in the appended claims:

1. In a microfilm reader of the type having a film table for supporting a microfilm and a light source behind the film table so that the light rays pass through the microfilm in a predetermined path, a combination comprising a lens carrier above the film table; a pair of projecting lenses mounted on said carrier; means mounting said carrier for pivotal movement about an axis inclined to said predetermined path between two end positions in each of which a different one of said lenses is interposed in said path; a H-shaped support having a cross bar fixed to the lens carrier and two longitudinal bars each having two ends, each of said ends being provided with a tab; and a number of pins arranged on the respective projecting lenses at a distance from each other for engaging with the respective tabs, so that said projecting lenses are resiliently fixed and supported in a floating manner.

2. A microfilm reader defined in claim 1, wherein the lens carrier is provided with a rectangular recess at the end remote from the projecting lenses, the reader further including means defining said axis inclined to said predetermined path, said rectangular recess receiving said axis-defining means.

3. A microfilm reader defined in claim 2, wherein said recess has a portion defining a hole of a truncated cone shape.

4. A microfilm reader, as defined in claim 1, wherein the two projecting lenses are arranged side-by-side in axially parallel alignment to each other.

5. A microfilm reader as defined in claim 1, wherein said mounting means comprises a handle integrally with the lens carrier in longitudinal direction thereof and disposed between the projecting lenses for moving the lens carrier between the end positions.

6. A microfilm reader defined in claim 3, wherein said axis-defining means include a stud bolt inserted through the hole, the stud bolt having a longitudinal axis inclined relative to the predetermined path and arranged as pivotal axis around which the lens carrier is movable.

7. A microfilm reader as defined in claim 6, wherein the stud bolt has a diameter corresponding to the width of the hole.

8. A microfilm reader device as defined in claim 7, wherein the hole is arranged essentially radial to the pivotal axis so that the lens carrier is inclinable relative to the pivotal axis.

9. A microfilm reading device as defined in claim 6, wherein the stud bolt includes a bolt, the major part thereof is surrounded by a sleeve which has a cylindrical portion and integrally therewith a hemispherical portion which is in engagement with a respective recess provided in the lens carrier.

10. A microfilm reader as defined in claim 9, wherein the stud bolt is further connected with a flat spring having one end protruding into the recess and fixed to the stud bolt and having another end abutting the lens carrier, the flat spring exerting a force on the lens carrier in downward direction.

11. A microfilm reader as defined in claim 10 wherein the microfilm reader further comprises an angle sheet iron having a horizontal portion fixed to the microfilm reader and a downward portion integrally connected therewith at an obtuse angle thereto, wherein the bolt is protruding through the downward portion on whose upper side the hemispherical portion of the sleeve is abutting with its flat part and on the underside thereof a nut is screwed on the bolt diametrically opposite to the hemispherical portion.

12. A microfilm reader as defined in claim 1, further comprising an additional support partly surrounding a major part of the lens carrier in longitudinal direction and having a rear end connected to the microfilm reader and side portions diverging therefrom, each of the side portions having a forward end provided with a stop pin for defining the end positions of the lens carrier.

13. A microfilm reader as defined in claim 12, further including a spring clip having two legs, said lens carrier being formed with an aperture at a distance from said recess in longitudinal direction, said additional support carrying a first pin fixed thereto and protruding through said aperture, one of the legs of said spring clip being secured to said first pin, said lens carrier carrying a second pin secured thereto and arranged at a distance to said first pin, the second leg of said spring clip being fixed to said second pin whereby said lens carrier is pressed into the end positions.

14. A microfilm reading device as defined in claim 13, wherein the spring clip is developed so as to exert no force on the lens carrier, when being in a midposition.

* * * * *